(12) United States Patent
Hinnegan

(10) Patent No.: US 11,017,114 B2
(45) Date of Patent: May 25, 2021

(54) COMPUTING SYSTEM WITH CONTENT DELIVERY MECHANISM AND METHOD OF OPERATION THEREOF

(71) Applicant: Telenav, Inc., Sunnyvale, CA (US)

(72) Inventor: John Hinnegan, Santa Monica, CA (US)

(73) Assignee: Telenav, Inc., Santa Clara, CA (US)

( * ) Notice: Subject to any disclaimer, the term of this patent is extended or adjusted under 35 U.S.C. 154(b) by 1228 days.

(21) Appl. No.: 14/143,164

(22) Filed: Dec. 30, 2013

(65) Prior Publication Data

US 2015/0186626 A1    Jul. 2, 2015

(51) Int. Cl.
*G06F 21/00* (2013.01)
*G06F 21/62* (2013.01)
*G06Q 30/02* (2012.01)

(52) U.S. Cl.
CPC ..... *G06F 21/6245* (2013.01); *G06Q 30/0241* (2013.01); *G06F 2221/2111* (2013.01)

(58) Field of Classification Search
CPC ......... G06F 2221/2111; G06F 21/6245; G06Q 30/0241
USPC .......................................................... 705/50
See application file for complete search history.

(56) References Cited

U.S. PATENT DOCUMENTS 8,612,891 B2 * 12/2013 Singh .................. G06F 21/6245
715/833
8,756,103 B1 * 6/2014 Amidon ................. G06Q 30/02
705/14.4
9,818,125 B2 * 11/2017 Mullen .............. G06Q 30/0641
2008/0262929 A1 10/2008 Behr
2010/0174607 A1 7/2010 Henkin et al.
2011/0178811 A1 * 7/2011 Sheridan ............... H04W 4/024
705/1.1

FOREIGN PATENT DOCUMENTS

WO     2008056350 A1     5/2008

OTHER PUBLICATIONS

Cognition—From Memory to Creativity, Weisberg, Reeves, 2013, John Wiley & Sons, pp. 13-40, 519-527.*
Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
(Continued)

*Primary Examiner* — David J Stoltenberg
*Assistant Examiner* — Michael I Ezewoko
(74) *Attorney, Agent, or Firm* — Perspectives Law Group, Corp.

(57) ABSTRACT

A method of operation of a computing system includes: determining a communication context with a control unit for communicating a target notification to a device; generating a disclosure permission for controlling a user's exposure to an advertiser, a publisher, or a combination thereof; and determining a presentation opportunity based on the communication context, the disclosure permission, or a combination thereof for presenting the target notification.

20 Claims, 5 Drawing Sheets

(56) References Cited

OTHER PUBLICATIONS

Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*
Creativity and Artificial Intelligence, Francisco Camara Pereira, Mouton de Gruyter, 2007, pp. 51-62.*
Mental Spaces, Gilles Fauconnier, Cambridge University Press, 1998, p. xxviii-xxix.*
Lazakidou, Virtual Communities, Social Networks, and Collaboration, Springer, 2012, pp. 162-174.*
Melazzi, Trustworthy Internet, 2011, pp. 143-157.*
HCI remixed : reflections on works that have influenced the HCI community, MIT Press, 2008: pp. 275-279.*
Why A Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapters) 1-9, [emphasis pp. 11-18].*
Algorithms + Data Structures = Programs, 1976, p. xii-55.*
Karabulut (2008).*

* cited by examiner

COMPUTING SYSTEM WITH CONTENT DELIVERY MECHANISM AND METHOD OF OPERATION THEREOF

TECHNICAL FIELD

The present invention relates generally to a computing system, and more particularly to a system with content delivery mechanism.

BACKGROUND ART

Modern portable consumer and industrial electronics, especially client devices such as computing systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Computing systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a computing system improving content delivery mechanism to protect user's privacy has become a paramount concern for the consumer. The inability decreases the benefit of using the tool.

Thus, a need still remains for a computing system with content delivery mechanism to the user's privacy. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a computing system including: determining a communication context with a control unit for communicating a target notification to a device; generating a disclosure permission for controlling a user's exposure to an advertiser, a publisher, or a combination thereof; and determining a presentation opportunity based on the communication context, the disclosure permission, or a combination thereof for presenting the target notification.

The present invention provides a computing system, including: a control unit for: determining a communication context with a control unit for communicating a target notification to a device, generating a disclosure permission for controlling a user's exposure to an advertiser, a publisher, or a combination thereof, determining a presentation opportunity based on the communication context, the disclosure permission, or a combination thereof, and a communication unit, coupled to the control unit, for communicating the target notification based on the presentation opportunity for presenting on the device.

An embodiment of the present invention provides a non-transitory computer readable medium including: determining a communication context for communicating a target notification to a device; generating a disclosure permission for controlling a user's exposure to an advertiser, a publisher, or a combination thereof; and determining a presentation opportunity based on the communication context, the disclosure permission, or a combination thereof for presenting the target notification.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
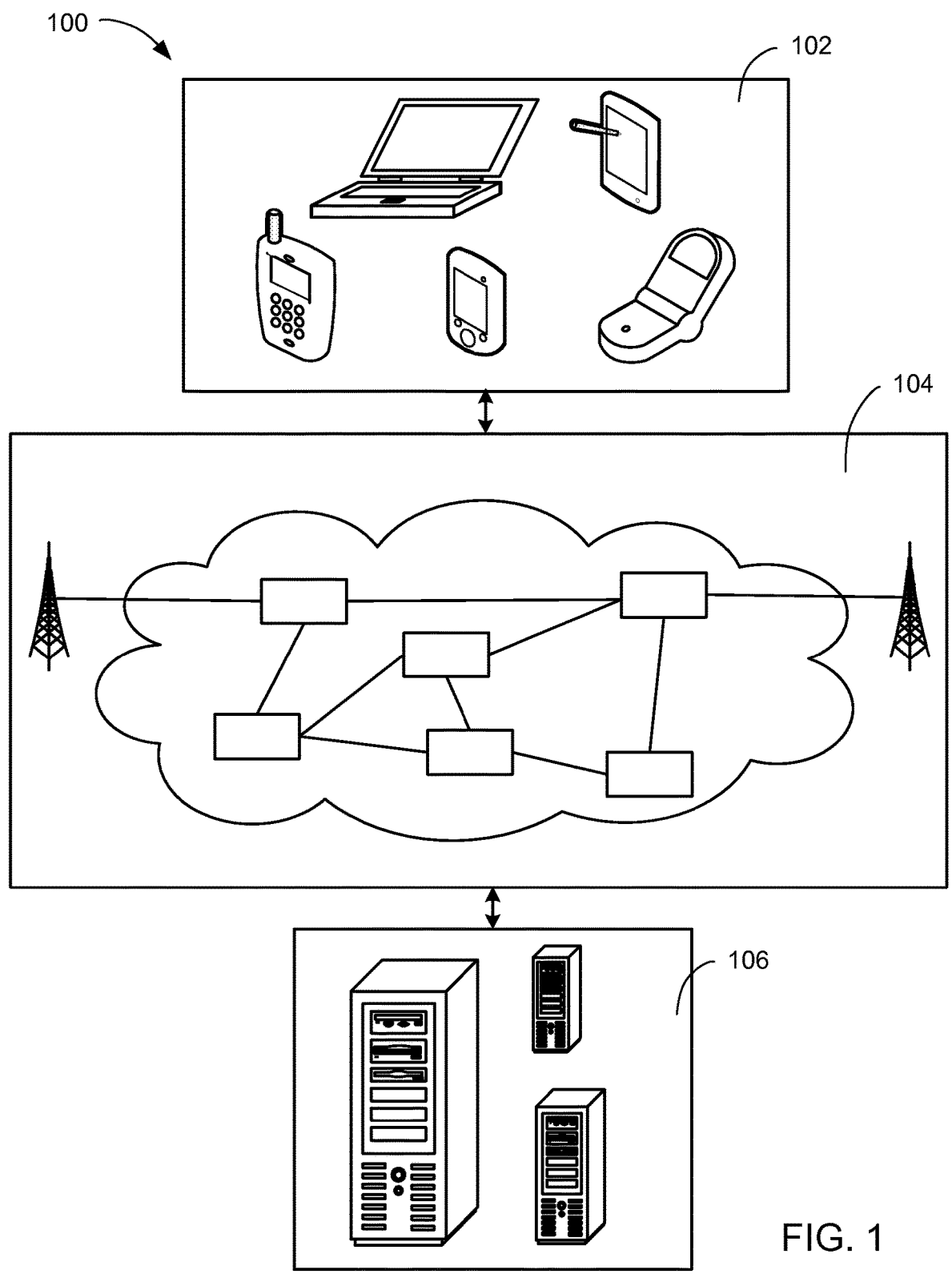
FIG. 1 is a computing system with content delivery mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the computing system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with content delivery mechanism in an embodiment of the present invention. The computing system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic computing system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the computing system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
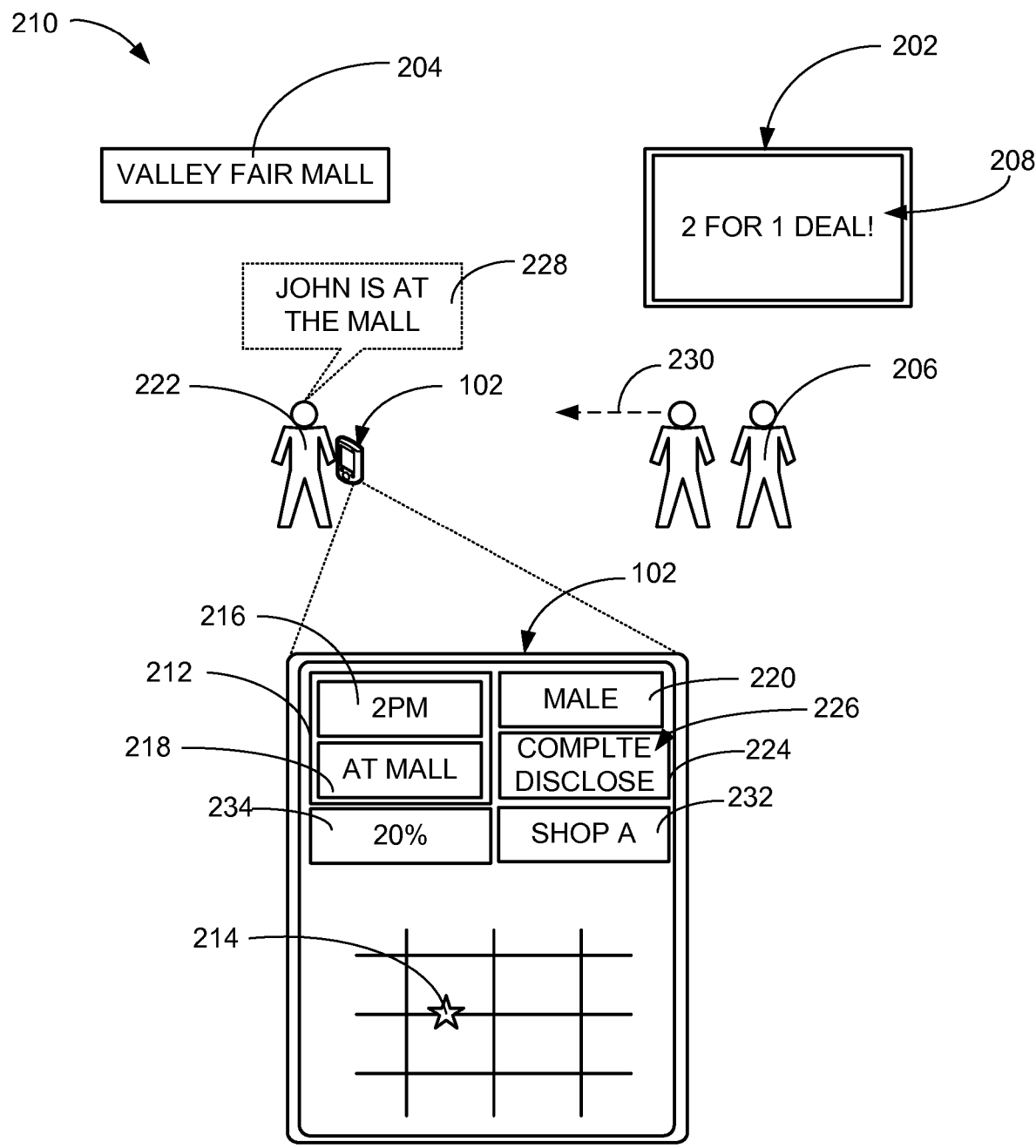
FIG. 2 is an example of a delivery of a target notification facilitated by the user of the computing system of FIG. 1.

Referring now to FIG. 2, there is shown an example of a delivery of a target notification 202 facilitated by the user of the computing system 100 of FIG. 1. For clarity and brevity, the discussion of the embodiment of the present invention will focus on the first device 102 delivering the result generated by the computing system 100. However, the second device 106 of FIG. 1 and the first device 102 can be discussed interchangeably.

The target notification 202 is defined as information presented to the first device 102. For example, the target notification 202 can represent an advertisement provided by an advertiser 204, a publisher 206, or a combination thereof. The target notification 202 can include a display content 208, which can represent a service, a product, or a combination thereof advertised by the advertiser 204. The advertiser 204 can represent a person or entity that produces the target notification 202. The publisher 206 can represent a person or entity that disseminates the target notification 202 on behalf of the advertiser 204. However, the embodiment of the present invention provides the mechanism for the user of the computing system 100 to control the delivery of the target notification 202 directly from the advertiser 204.

A communication context 210 is defined as a situation, circumstance, or a combination thereof surrounding the first device 102. For example, the communication context 210 can be determined based on a transaction factor 212. The transaction factor 212 can include a current location 214, a communication time 216, an activity history 218, or a combination thereof.

The current location 214 is defined as a current position of the first device 102. For example, the current location 214 can represent the current GPS fix of the first device 102. The communication time 216 is defined as a time frame. For example, the communication time 216 can represent a time of day, week, month, year, or a combination thereof. For another example, the communication time 216 can represent a time span of day, week, month, year, or a combination thereof. The activity history 218 is defined as a log of a user's activity. For example, the activity history 218 can represent the log of the user using the computing system 100. For another example, the activity history 218 can represent the log of the user using the first device 102. A user profile 220 is defined as user's personal information. For example, the user profile 220 can include the user's profession, user's gender, user's age, user's interest, user's address information, the current location 214, or a combination thereof.

A user's exposure 222 is defined as a state of having the user profile 220 exposed. The user's exposure 222 can be controlled by a disclosure permission 224, which is defined as an authorization to expose the user profile 220. The disclosure permission 224 can include a permission level 226, which is defined as a range of exposing the user profile 220. For example, the permission level 226 can range from 0 to 1 or 0 to 100. More specifically, the permission level 226 of 0 can represent "no disclosure," thus, the user profile 220 will not be exposed to the advertiser 204, the publisher 206, or a combination thereof. In contrast, the permission level 226 of 1 or 100 can represent "complete disclosure," thus, all information related to the user profile 220 can be exposed to the advertiser 204, the publisher 206, or a combination thereof.

An exposure information 228 is defined as the user profile 220 permitted to be exposed. For example, based on the permission level 226, the amount of the exposure information 228 can range from "no disclosure" to "complete disclosure." More specifically, the exposure information 228 can include the current location 214 without the user's gender if the permission level 226 is less than "complete disclosure." A presentation opportunity 230 is defined as an appropriate or favorable time or occasion to deliver the target notification 202.

An auction result 232 is a bidding outcome to deliver the target notification 202, access the user profile 220, or a combination thereof. A revenue distribution 234 is an allocation of the revenue for delivering the target notification 202. The revenue distribution 234 can be allocated amongst the user, the advertiser 204, the publisher, 206, or a combination thereof. If the advertiser 204 directly communicates the target notification 202 to the user, the publisher 206 can still receive a fixed amount of the revenue distribution 234.

Figure 3:
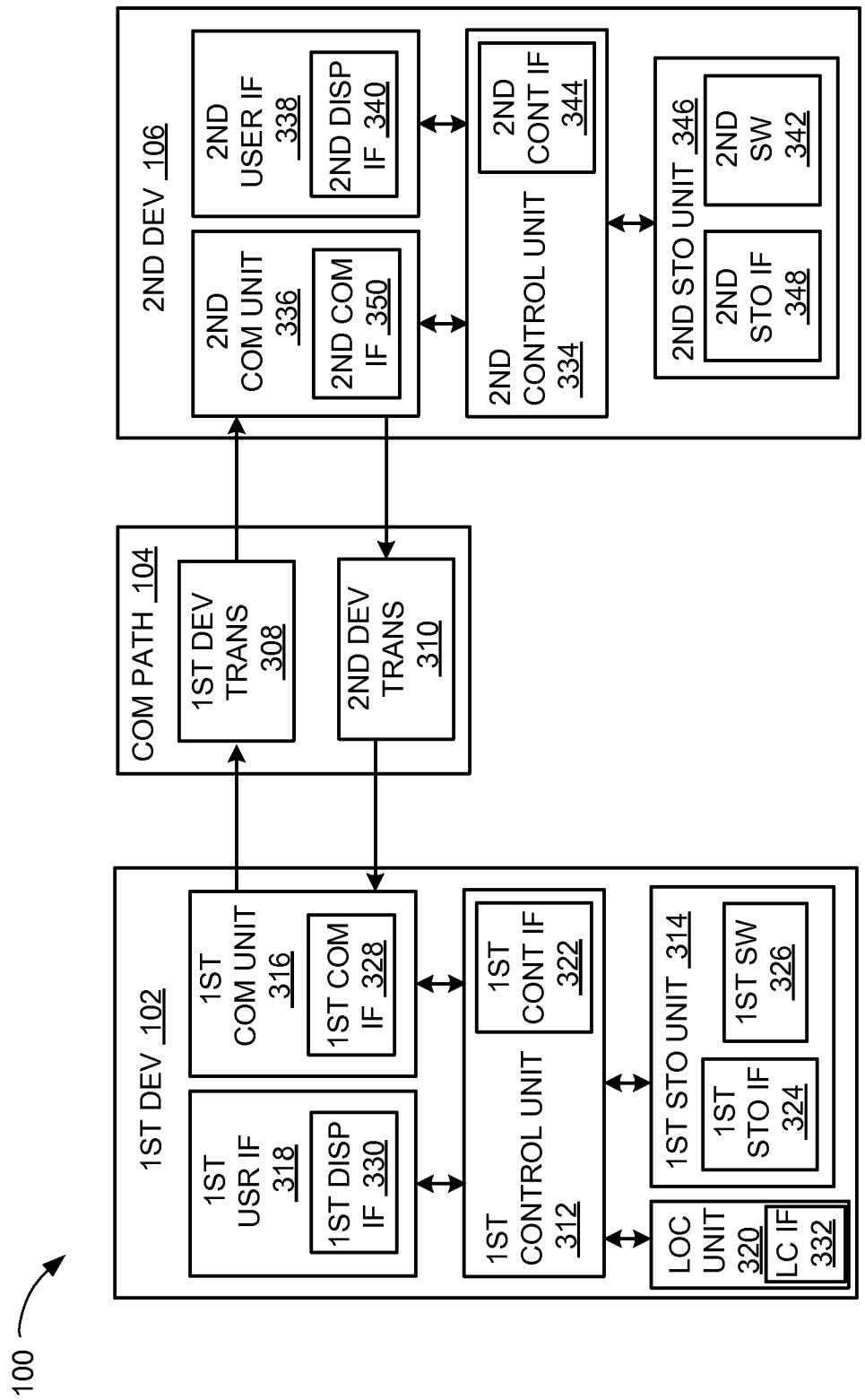
FIG. 3 is an exemplary block diagram of the computing system.

Referring now to FIG. 3, therein is shown an exemplary block diagram of the computing system 100. The computing system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a server.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the computing system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial computing system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, a camera, or any combination thereof to provide data and communication inputs.

The first user interface 318 can include a first display interface 330. The first display interface 330 can include a display, a projector, a video screen, a speaker, a headset, or any combination thereof.

The first control unit 312 can operate the first user interface 318 to display information generated by the computing system 100. The first control unit 312 can also execute the first software 326 for the other functions of the computing system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera, or any combination thereof to provide data and communication inputs. Examples of the output device of the second user interface 338 can include a second display interface 340. The second display interface 340 can include a display, a projector, a video screen, a speaker, a headset, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The computing system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100. For example, the first device 102 is described to operate the location unit 320, although it is understood that the second device 106 can also operate the location unit 320.

Figure 4:
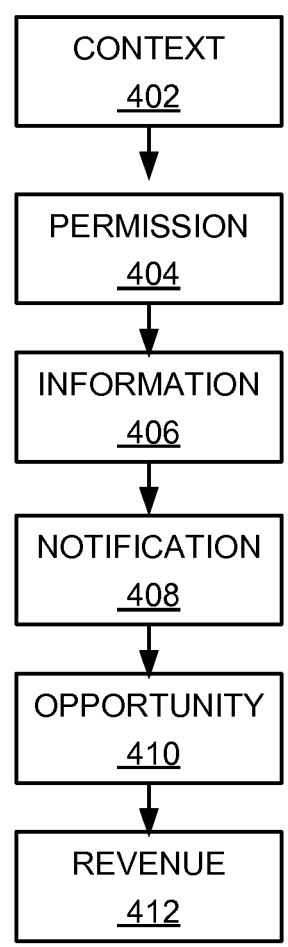
FIG. 4 is a control flow of the computing system.

Referring now to FIG. 4, therein is shown a control flow of the computing system 100 of FIG. 1. The computing system 100 can include a context module 402. The context module 402 determines the communication context 210 of FIG. 2. For example, the context module 402 can determine the communication context 210 based on a transaction factor 212 of FIG. 2.

The context module 402 can determine the communication context 210 in a number of ways. For example, the context module 402 can determine the communication context 210 based on the transaction factor 212 surrounding the user of the computing system 100. More specifically, the transaction factor 212 can include the current location 214 of FIG. 2, the communication time 216 of FIG. 2, the activity history 218 of FIG. 2, or a combination thereof.

For a specific example, the context module 402 can determine the communication context 210 based on the current location 214. The context module 402 can determine the current location 214 via the location unit 320 of FIG. 3. More specifically, the current location 214 of the user can represent a shopping mall. The context module 402 can determine the communication context 210 to represent that the user is in the shopping mall for shopping. Moreover, the context module 402 can determine the communication context 210 to represent that the user may be more inclined to receive the target notification 202 of FIG. 2. In contrast, the current location 214 can represent a hospital. The context module 402 can determine the communication context 210 to represent that the user is not at the hospital for shopping, thus, less inclined to receive the target notification 202.

For another example, the context module 402 can determine the communication context 210 based on the communication time 216. For example, the communication time 216 can represent 8 AM on a weekday. The context module 402 can determine the communication context 210 to represent commute hour for the user based on the communication time 216, thus, the user is less inclined to receive the target notification 202. In contrast, the communication time 216 can represent 2 PM during the weekend. The context module 402 can determine the communication context 210 to represent that user is not at work, thus, the user may be inclined to receive the target notification 202.

For another example, the context module 402 can determine the communication context 210 based on the activity history 218. For example, the activity history 218 can indicate that the user is frequently viewing the social network site via the first device 102 of FIG. 1 within the communication time 216 of the last hour. The context module 402 can determine the communication context 210 of the user currently has time in his hand. In contrast, the activity history 218 can indicate that the user is sending email from his work account via the first device 102. The context module 402 can determine the communication context 210 that the user should not be disturbed. The context module 402 can communicate the communication context 210 to a permission module 404.

The computing system 100 can include the permission module 404, which can couple to the context module 402. The permission module 404 generates the disclosure permission 224 of FIG. 2. For example, the permission module 404 can generate the disclosure permission 224 for controlling the user's exposure 222 of FIG. 2 to the advertiser 204 of FIG. 2, the publisher 206 of FIG. 2, or a combination thereof.

The permission module 404 can generate the disclosure permission 224 in a number of ways. For example, the permission module 404 can generate the disclosure permission 224 having the permission level 226 of FIG. 2 based on the communication context 210, the user profile 220 of FIG. 2, the display content 208 of FIG. 2, or a combination thereof.

For a specific example, the permission module 404 can generate the disclosure permission 224 based on the communication context 210. More specifically, the communication context 210 can represent that the user is currently travelling for business. The permission module 404 can generate the disclosure permission 224 of "no disclosure" to avoid sending the current location 214 to the advertiser 204, the publisher 206, or a combination thereof. In contrast, the communication context 210 can represent shopping at a shopping mall as discussed above. The permission module 404 can generate the disclosure permission 224 of "disclosure permitted" to allow sending the current location 214 to the advertiser 204, the publisher 206, or a combination thereof.

For another example, the permission module 404 can generate the disclosure permission 224 based on the user profile 220. More specifically, the user profile 220 can be set so that no information related the user can be shared amongst the advertiser 204, the publisher 206, or a combination thereof. As a result, the permission module 404 can generate the disclosure permission 224 of "no disclosure" based on the user profile 220 for controlling the user's exposure 222 to the advertiser 204, the publisher 206, or a combination thereof.

For further example, the permission module 404 can generate the disclosure permission 224 having the permission level 226 based on the user profile 220, the communication context 210, or a combination thereof. More specifically, the permission level 226 can range from 0 representing "no disclosure" to 1 representing "complete disclosure" based on the user profile 220 for certain instance of the communication context 210. For example, the user profile 220 can represent that the user is a military personnel. The communication context 210 can represent that the current location 214 of the user can be at a military base. The permission module 404 can generate the disclosure permission 224 having the permission level 226 of 0 or "no disclosure" to limit the user's exposure 222.

In contrast, the same user can be in the communication context 210 representing visiting a veterans hospital. The permission module 404 can generate the disclosure permission 224 having the permission level 226 between 0 and 1 to tolerate the user's exposure 222 yet maintain control over the user's exposure 222.

For another example, the permission module 404 can generate the disclosure permission 224 based on the display content 208 of the target notification 202. More specifically, the display content 208 can represent the target notification 202 for a service, product, or a combination thereof. For example, the display content 208 can represent the target notification 202 for a female hair care product. The permission module 404 can generate the disclosure permission 224 having the permission level 226 to permit the user's exposure 222 related to the user profile 220 regarding the user's gender but no other information.

For another example, the permission module 404 can generate the disclosure permission 224 based on the auction result 232 of FIG. 2. More specifically, the permission module 404 can auction the permission level 226 for allowing the user's exposure 222 to the publisher 206, the advertiser 204, or a combination thereof and for controlling the revenue distribution 234 of FIG. 2. For example, the permission module 404 can auction the permission level 226 at a various price point for each degree of the user's exposure 222. For a specific example, the permission level 226 of "complete disclosure" can be more monetarily expensive to the advertiser 204, the publisher 206, or a combination thereof than the permission level 226 of "no disclosure." Based on the auction result 232 of the advertiser 204, the publisher 206, or a combination thereof auctioning for the permission level 226, the permission module 404 can generate the disclosure permission 224 for the advertiser 204, the publisher 206, or a combination thereof. The permission module 404 can communicate the disclosure permission 224 to an information module 406.

It has been discovered that the computing system 100 generating the disclosure permission 224 can improve the efficiency of communicating the target notification 202 to the user. By generating the disclosure permission 224 having the permission level 226, the computing system 100 can protect the privacy of the user by limiting the user's exposure 222 to the advertiser 204, the publisher 206, or a combination thereof. As a result, the user can receive the target notification 202 most suited for the user for improved operation of the computing system 100.

The computing system 100 can include the information module 406, which can couple to the permission module 404. The information module 406 generates the exposure information 228 of FIG. 2. For example, the information module 406 can generate the exposure information 228 based on the disclosure permission 224, the communication context 210, or a combination thereof.

The information module 406 can generate the exposure information 228 in a number of ways. For example, the information module 406 can generate the exposure information 228 based on the permission level 226 of the disclosure permission 224. If the permission level 226 represents "no disclosure," the information module 406 can generate the exposure information 228 with no information regarding the user. In contrast, if the permission level 226 represents "complete disclosure," the information module 406 can generate the exposure information 228 having the information on the user profile 220, the current location 214, or a combination thereof.

For further example, the range of the content included in the exposure information 228 can vary based on the permission level 226. More specifically, as discussed above, the permission level 226 can range from 0 to 1. For example, if the permission level 226 is set to a value of 0.3, the information module 406 can generate the exposure information 228 with the user profile 220 having the user's gender but without the current location 214.

For another example, the information module 406 can generate the exposure information 228 based on the communication context 210. Even if the permission level 226 is set to "complete disclosure," the information module 406 can generate the exposure information 228 with "no disclosure" or less than complete disclosure based on the communication context 210. For example, continuing with the example above, the user profile 220 can represent military personnel with the permission level 226 set as "complete disclosure." The communication context 210 can represent that the current location 214 of the user is in a classified location. The information module 406 can generate the exposure information 228 without the current location 214 based on the communication context 210. The information module 406 can communicate the exposure information 228 to a notification module 408.

The computing system 100 can include the notification module 408, which can couple to the information module 406. The notification module 408 generates the target notification 202. For example, the notification module 408 can generate the target notification 202 having the display content 208 based on the exposure information 228.

More specifically, the notification module 408 can generate the target notification 202 based on the user's exposure 222 determined by the details of the user profile 220 disclosed in the exposure information 228. For example, the exposure information 228 can disclose the current location 214 representing a grocery store. The notification module 408 can generate the target notification 202 representing an advertisement for a product sold in the grocery store based on the current location 214. The notification module 408 can communicate the target notification 202 to an opportunity module 410.

The computing system 100 can include the opportunity module 410, which can couple to the notification module 408. The opportunity module 410 determines the presentation opportunity 230 of FIG. 2. For example, the opportunity module 410 can determine the presentation opportunity 230 based on the target notification 202, the exposure information 228, the communication context 210, or a combination thereof.

The opportunity module 410 can determine the presentation opportunity 230 in a number of ways. For example, the communication context 210 can represent the user shopping at the shopping mall. Based on the current location 214, which can represent in front of a toy store, the opportunity module 410 can determine the presentation opportunity 230 of communicating the target notification 202 representing an advertisement for the toy store directly to the first device 102 from the advertiser 204 without going through the publisher 206. In contrast, the communication context 210 can represent the user operating a vehicle. Even if the target notification 202 is generated based on the exposure information 228, the opportunity module 410 can determine that the presentation opportunity 230 does not exist for communicating the target notification 202 while the vehicle is in motion.

For another example, the opportunity module 410 can determine the presentation opportunity 230 based on the auction result 232. More specifically, the opportunity module 410 can auction the presentation opportunity 230 for the advertiser 204, the publisher 206, or a combination thereof to present the target notification 202 to the first device 102. For example, the opportunity module 410 can determine the presentation opportunity 230 based on the auction result 232 of permitting the publisher 206, the advertiser 204, or a combination thereof that paid the most monetary value to the user of the computing system 100 can present the target notification 202 on the first device 102.

The computing system 100 can include a revenue module 412, which can couple to the opportunity module 410. The revenue module 412 calculates the revenue distribution 234. For example, the revenue module 412 can calculate the revenue distribution 234 based on the target notification 202, the presentation opportunity 230, the disclosure permission 224, or a combination thereof.

The revenue module 412 can calculate the revenue distribution 234 in a number of ways. For example, the revenue module 412 can calculate the revenue distribution 234 based on the permission level 226 of the disclosure permission 224 for limiting the revenue distribution 234 to the advertiser 204, the publisher 206, or a combination thereof. More specifically, the revenue module 412 can calculate a greater amount of the revenue distribution 234 for the user if the permission level 226 can represent "complete disclosure" than the permission level 226 of "no disclosure."

For another example, the revenue module 412 can calculate the revenue distribution 234 based on the presentation opportunity 230 for limiting the revenue distribution 234 to the advertiser 204, the publisher 206, or a combination thereof. The revenue module 412 can calculate the revenue distribution 234 with a greater amount for the user if there is no limitation for the presentation opportunity 230 to present the target notification 202 to the user than a limited instance of the presentation opportunity 230.

The physical transformation from traveling from one instance of the communication context 210 to another instance of the communication context 210 results in the movement in the physical world, such as people using the first device 102, the vehicle, or a combination thereof, based on the operation of the computing system 100. As the movement in the physical world occurs, the movement itself creates additional information that is converted back into generating the disclosure permission 224, the exposure information 228, the target notification 202, and determining the presentation opportunity 230, or a combination thereof for the continued operation of the computing system 100 and to continue the movement in the physical world.

The first software 326 of FIG. 3 of the first device 102 of FIG. 3 can include the modules for the computing system 100. For example, the first software 326 can include the context module 402, the permission module 404, the information module 406, the notification module 408, the opportunity module 410, and the revenue module 412.

The first control unit 312 of FIG. 3 can execute the first software 326 for the context module 402 to determine the communication context 210. The first control unit 312 can execute the first software 326 for the permission module 404 to generate the disclosure permission 224. The first control unit 312 can execute the first software 326 for the information module 406 to generate the exposure information 228.

The first control unit 312 can execute the first software 326 for the notification module 408 to generate the target notification 202. The first control unit 312 can execute the first software 326 for the opportunity module 410 to determine the presentation opportunity 230. The first control unit 312 can execute the first software 326 for the revenue module 412 to calculate the revenue distribution 234.

The second software 342 of FIG. 3 of the second device 106 of FIG. 3 can include the modules for the computing system 100. For example, the second software 342 can include the context module 402, the permission module 404, the information module 406, the notification module 408, the opportunity module 410, and the revenue module 412.

The second control unit 334 of FIG. 3 can execute the second software 342 for the context module 402 to determine the communication context 210. The second control unit 334 can execute the second software 342 for the permission module 404 to generate the disclosure permission 224. The second control unit 334 can execute the second software 342 for the information module 406 to generate the exposure information 228.

The second control unit 334 can execute the second software 342 for the notification module 408 to generate the target notification 202. The second control unit 334 can execute the second software 342 for the opportunity module 410 to determine the presentation opportunity 230. The second control unit 334 can execute the second software 342 for the revenue module 412 to calculate the revenue distribution 234.

The modules of the computing system 100 can be partitioned between the first software 326 and the second software 342. The second software 342 can include the context module 402, the permission module 404, the information module 406, the notification module 408, and the opportunity module 410. The second control unit 334 can execute modules partitioned on the second software 342 as previously described.

The first software 326 can include the revenue module 412. Based on the size of the first storage unit 314 of FIG. 3, the first software 326 can include additional modules of the computing system 100. The first control unit 312 can execute the modules partitioned on the first software 326 as previously described.

The first control unit 312 can operate the first communication unit 316 of FIG. 3 to communicate the current location 206, the disclosure permission 224, the exposure information 228, the target notification 202, the presentation opportunity 230, the revenue distribution 234, or a combination thereof to or from the second device 106. The first control unit 312 can operate the first software 326 to operate the location unit 320 of FIG. 3. The second control unit 334 can operate the second communication unit 336 of FIG. 3 communicate the current location 206, the disclosure permission 224, the exposure information 228, the target notification 202, the presentation opportunity 230, the revenue distribution 234, or a combination thereof to or from the first device 102 through the communication path 104 of FIG. 3.

The first control unit 312 can operate the first user interface 318 of FIG. 3 to present the target notification 202. The second control unit 334 can operate the second user interface 338 of FIG. 3 to present the target notification 202.

The computing system 100 describes the module functions or order as an example. The modules can be partitioned differently. For example, the notification module 408 and the opportunity module 410 can be combined. Each of the modules can operate individually and independently of the other modules. Furthermore, data generated in one module can be used by another module without being directly coupled to each other. For example, the opportunity module 410 can receive the communication context 210 from the context module 402. Further, one module communicating to another module can represent one module sending, receiving, or a combination thereof the data generated to or from another module.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively as depicted in FIG. 3. However, it is understood that the first control unit 312, the second control unit 334, or a combination thereof can collectively refer to all hardware accelerators for the modules. Further, that the first control unit 312, the second control unit 334, or a combination thereof can be implemented as software, hardware, or a combination thereof.

The modules described in this application can be implemented as instructions stored on a non-transitory computer readable medium to be executed by the first control unit 312, the second control unit 334, or a combination thereof. The non-transitory computer medium can include the first storage unit 314, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

It has been discovered that the computing system 100 determining the communication context 210 can improve the efficiency of communicating the target notification 202 to the user. By generating the disclosure permission 224, the computing system 100 can control the user's exposure 222 to the advertiser 204, the publisher 206, or a combination thereof. Further, by limiting the presentation opportunity 230 based on the communication context 210, the presentation opportunity 230, or a combination thereof, the computing system 100 can improve the privacy of the user being exposed for enhanced user experience operating the computing system 100.

Figure 5:
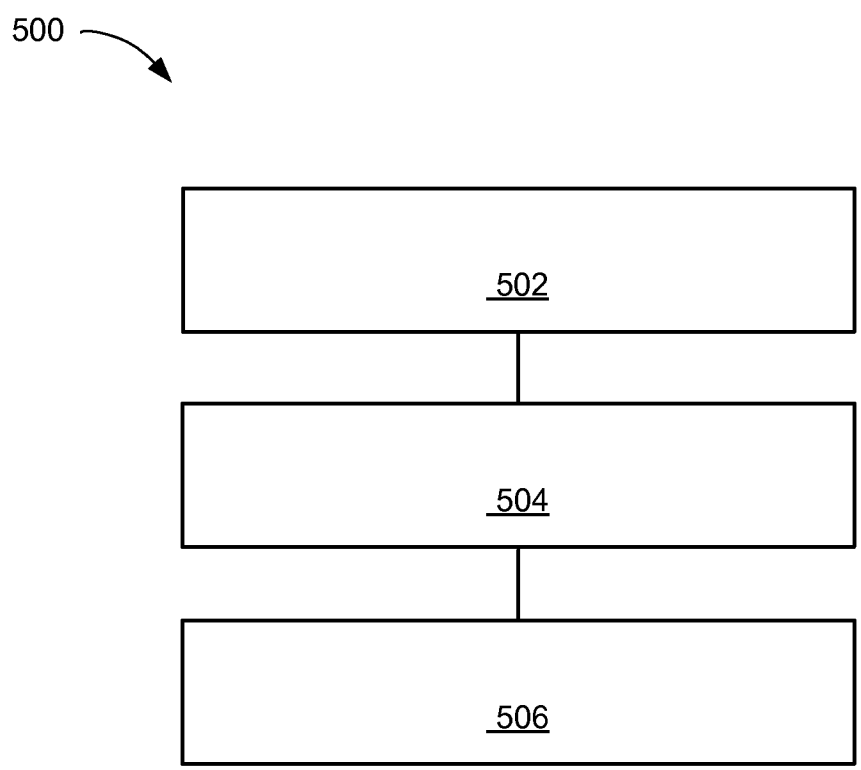
FIG. 5 is a flow chart of a method of operation of the computing system in a further embodiment of the present invention.

Referring now to FIG. 5, therein is shown a flow chart of a method 500 of operation of the computing system 100 in a further embodiment of the present invention. The method 500 includes: determining a communication context with a control unit for communicating a target notification to a device in a block 502; generating a disclosure permission for controlling a user's exposure to an advertiser, a publisher, or a combination thereof in a block 504; and determining a presentation opportunity based on the communication context, the disclosure permission, or a combination thereof for presenting the target notification in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a computing system comprising:
    determining a communication context according to a current location for communicating a target notification to a first device including a location unit representing a global positioning system to detect the current location;
    generating a disclosure permission including a permission level dynamically and in real time with a control unit representing a processor based on a communication context for controlling a user's exposure, by the control unit of a second device, to an advertiser, a publisher, or a combination thereof wherein the permission level to expose a user profile differ when the current location changes to another based on a change in the communication context;
    generating an exposure information based on the disclosure permission, the user profile, or a combination thereof;
    overriding the disclosure permission based on the communication context wherein the exposure information, within the communication context where the current location is detected, having a content different from the content allowed under the permission level; and
    determining a presentation opportunity based on the communication context, the disclosure permission, or a combination thereof to control a delivery of the target notification based on the exposure information to limit the user's exposure for delivering the target notification on the first device.

2. The method as claimed in claim 1 wherein generating the disclosure permission includes generating the disclosure permission having the permission level for controlling the user's exposure.

3. The method as claimed in claim 1 wherein generating the disclosure permission includes generating the disclosure permission based on an auction result for permitting the advertiser, the publisher, or a combination thereof to communicate the target notification.

4. The method as claimed in claim 1 further comprising auctioning the permission level for controlling a revenue distribution.

5. The method as claimed in claim 1 further comprising generating the exposure information based on the disclosure permission for controlling a user profile disclosed to the advertiser, the publisher, or a combination thereof.

6. The method as claimed in claim 1 further comprising generating the exposure information based on the communication context for controlling the user's exposure.

7. The method as claimed in claim 1 further comprising auctioning the presentation opportunity for controlling a revenue distribution.

8. The method as claimed in claim 1 wherein determining the presentation opportunity includes determining the presentation opportunity based on an auction result for permitting the advertiser, the publisher, or a combination thereof to communicate the target notification.

9. The method as claimed in claim 1 further comprising calculating a revenue distribution based on the disclosure permission for limiting the revenue distribution to the advertiser, the publisher, or a combination thereof.

10. The method as claimed in claim 1 further comprising calculating a revenue distribution based on the presentation opportunity for limiting the revenue distribution to the advertiser, the publisher, or a combination thereof.

11. A computing system comprising:
    a second control unit including a processor for:
        determining a communication context according to a current location for communicating a target notification to a first device including a location unit representing a global positioning system to detect the current location,
        generating a disclosure permission including a permission level dynamically and in real time based on a communication context for controlling a user's exposure to an advertiser, a publisher, or a combination thereof wherein the permission level to expose a user profile differ when the current location changes to another based on a change in the communication context,
        generating an exposure information based on the disclosure permission, the user profile, or a combination thereof;
        overriding the disclosure permission based on the communication context wherein the exposure information, within the communication context where the current location is detected, having a content different from the content allowed under the permission level,
        determining a presentation opportunity based on the communication context, the disclosure permission, or a combination thereof to control a delivery of the target notification based on the exposure information to limit the user's exposure, and a communication unit, coupled to the control unit, for communicating the target notification based on the presentation opportunity for presenting on the first device.

12. The system as claimed in claim 11 wherein the control unit is for generating the disclosure permission having the permission level for controlling the user's exposure.

13. The system as claimed in claim 11 wherein the control unit is for generating the disclosure permission based on an auction result for permitting the advertiser, the publisher, or a combination thereof to communicate the target notification.

14. The system as claimed in claim 11 wherein the control unit is for auctioning the permission level for controlling a revenue distribution.

15. The system as claimed in claim 11 wherein the control unit is for generating the exposure information based on the disclosure permission for controlling a user profile disclosed to the advertiser, the publisher, or a combination thereof.

16. A non-transitory computer readable medium comprising:
determining a communication context according to a current location for communicating a target notification to a first device including a location unit representing a global positioning system to detect the current location;
generating a disclosure permission including a permission level dynamically and in real time with a control unit representing a processor based on a communication context for controlling a user's exposure, by the control unit of a second device, to an advertiser, a publisher, or a combination thereof wherein the permission level to expose a user profile differ when the current location changes to another based on a change in the communication context;
generating an exposure information based on the disclosure permission, the user profile, or a combination thereof;
overriding the disclosure permission based on the communication context wherein the exposure information, within the communication context where the current location is detected, having a content different from the content allowed under the permission level based on the communication context; and
determining a presentation opportunity based on the communication context, the disclosure permission, or a combination thereof to control a delivery of the target notification based on the exposure information to limit the user's exposure for delivering the target notification on the first device.

17. The non-transitory computer readable medium as claimed in claim 16 wherein generating the disclosure permission includes generating the disclosure permission having the permission level for controlling the user's exposure.

18. The non-transitory computer readable medium as claimed in claim 16 wherein generating the disclosure permission includes generating the disclosure permission based on an auction result for permitting the advertiser, the publisher, or a combination thereof to communicate the target notification.

19. The non-transitory computer readable medium as claimed in claim 16 further comprising auctioning the permission level for controlling a revenue distribution.

20. The non-transitory computer readable medium as claimed in claim 16 further comprising generating the exposure information based on the disclosure permission for controlling a user profile disclosed to the advertiser, the publisher, or a combination thereof.

* * * * *